United States Patent
Briggs et al.

(10) Patent No.: US 7,163,913 B2
(45) Date of Patent: Jan. 16, 2007

(54) VISCOSITY INDEX IMPROVERS FOR LUBRICATING OIL COMPOSITIONS

(75) Inventors: Stuart Briggs, Edison, NJ (US); Chin Chu, Westwood, NJ (US)

(73) Assignee: Infineum International Limited, Oxfordshire (GB)

( * ) Notice: Subject to any disclaimer, the term of this patent is extended or adjusted under 35 U.S.C. 154(b) by 631 days.

(21) Appl. No.: 10/611,231

(22) Filed: Jul. 1, 2003

(65) Prior Publication Data
US 2005/0003974 A1    Jan. 6, 2005

(51) Int. Cl.
*C10M 143/00*  (2006.01)
*C08F 36/00*  (2006.01)

(52) U.S. Cl. .................. 508/591; 526/335; 585/10; 585/12

(58) Field of Classification Search ............ 508/591
See application file for complete search history.

(56) References Cited

U.S. PATENT DOCUMENTS

| | | | |
|---|---|---|---|
| 3,795,615 A | 3/1974 | Pappas et al. ............ 252/59 |
| 4,032,459 A | 6/1977 | Crossland et al. ....... 252/51.5 A |
| 4,073,737 A | 2/1978 | Elliott ..................... 252/51.5 A |
| 4,116,917 A | 9/1978 | Eckert ..................... 260/33.6 AQ |
| 4,156,673 A | 5/1979 | Eckert ..................... 260/33.6 |
| 4,409,120 A | 10/1983 | Martin ..................... 525/280 |
| 4,849,481 A * | 7/1989 | Rhodes et al. ............ 525/314 |
| 5,310,490 A * | 5/1994 | Struglinski et al. ....... 508/591 |
| 5,458,791 A * | 10/1995 | Rhodes et al. ............ 508/591 |
| 5,460,739 A | 10/1995 | Rhodes et al. ............ 252/43 |
| 5,543,469 A * | 8/1996 | Struglinski et al. ....... 525/314 |
| 5,633,415 A | 5/1997 | Brandes et al. ........... 585/12 |
| 5,637,783 A | 6/1997 | Brandes et al. ........... 585/12 |
| 5,780,540 A | 7/1998 | Brandes et al. ........... 524/572 |
| 6,034,042 A * | 3/2000 | Rhodes ..................... 508/591 |
| 6,303,550 B1 * | 10/2001 | Wedlock et al. .......... 508/591 |

* cited by examiner

*Primary Examiner*—Ellen M. McAvoy

(57) ABSTRACT

A polymer suitable for use as a viscosity index improver for lubricating oil compositions, which is at least one, at least partially hydrogenated linear or star-shaped random copolymer of isoprene and butadiene, in which at least 70 wt. % of the butadiene is incorporated into the polymer as 1,4 units and the weight ratio of isoprene addition product to butadiene addition product in the copolymer is in a range of from about 90:10 to about 70:30.

14 Claims, No Drawings

VISCOSITY INDEX IMPROVERS FOR LUBRICATING OIL COMPOSITIONS

FIELD OF THE INVENTION

The invention is directed to polymers suitable for use as viscosity index improvers for lubricating oil compositions, and to lubricating oil compositions containing the defined polymers. More specifically, the present invention is directed to certain linear, radial and star-shaped random copolymers of isoprene and butadiene, block copolymers wherein at least one block is a random copolymer of isoprene and butadiene; and to lubricating oil compositions containing the defined copolymers.

BACKGROUND OF THE INVENTION

Lubricating oils for use in crankcase engine oils contain components that are used to improve the viscometric performance of the engine oil, i.e., to provide multigrade oils such as SAE 5W-30, 10W-30 and 10W-40. These viscosity performance enhancers, commonly referred to as viscosity index (VI) improvers include olefin copolymers, polymethacrylates, styrene/hydrogenated diene block and star copolymers and hydrogenated isoprene star polymers.

Olefin copolymers (or OCP) used as viscosity index improvers conventionally comprise copolymers of ethylene, propylene and, optionally, a diene. Small polymeric side chains do not exert a substantial viscosity modifying effect in oil. Polymerized propylene has one methyl branch for every two backbone carbon atoms. Ethylene polymer is substantially straight chained. Therefore, at a constant amount of polymer in oil (treat rate), an OCP having a higher ethylene content will display an increased high temperature thickening effect (thickening efficiency, or TE). However, polymer chains having long ethylene sequences have a more crystalline polymer structure. Crystalline polymers are less oil soluble than amorphous polymers and as a result, the OCP can drop out of the oil, causing the plugging of engine filters (and the loss of the viscosity modifying effect). Further, OCPs having substantial crystalline segments have been found, again primarily at low temperatures, to interact with waxes in the oil, and other OCP chains, which results in uncontrollable increases in low temperature viscosity and, in extreme cases, the gelling of the lubricating oil. These problems have been found to manifest in Ziegler Natta polymerized OCPs containing greater than about 60 wt. % ethylene (hereinafter referred to as "high ethylene content OCP(s)").

Due to their molecular architecture, star polymers are known to provide improved shear stability compared to OCPs. VI improvers that are star polymers made by hydrogenation of anionically polymerized isoprene are commercially available. Anionic polymerization results in a relatively low molecular weight distribution (Mw/Mn). Hydrogenation results in alternating ethylene/propylene units having a composition comparable to a polymer derived from 40 wt. % ethylene and 60 wt. % propylene. These VI improvers provide excellent shear stability, good solubility and excellent cold temperature properties. However, improvements in the balance between the thickening efficiency and shear stability of star polymers remain possible.

U.S. Pat. No. 4,116,917 exemplifies certain star polymers comprising hydrogenated poly(butadiene/isoprene) tapered arms containing about 44.3 wt. % polymer derived from butadiene. Since butadiene initially reacts faster than isoprene when anionic polymerization is initiated with secondary butyllithium (the process described in the patent), a polybutadiene block is first formed. As the butadiene concentration is lowered through polymerization, isoprene begins to add to the living polymer so that, when the polymerization reaction is complete, the chain is made up of a polybutadiene block, a tapered segment containing both butadiene and isoprene addition product, and a polyisoprene block resulting in a living tapered polymer chains that, when coupled with divinylbenzene, produce a star polymer having a polybutadiene block positioned distal from the divinylbenzene-coupled core. The long ethylene sequences of these external hydrogenated polybutadiene blocks were found to cause the same low temperature performance problems associated with high ethylene content OCPs.

To provide an improvement in thickening efficiency, while maintaining low temperature performance, U.S. Pat. No. 5,460,739 suggests star polymers comprising triblock copolymer arms of hydrogenated polyisoprene/polybutadiene/polyisoprene. The hydrogenated polybutadiene block provides an increased ethylene content, which improves thickening efficiency. The patent suggests that, by placing the hydrogenated polybutadiene block more proximal to the nucleus, the adverse effect on low temperature properties could be minimized. Such polymers were found to provide improved low temperature properties relative to the tapered arm polymers of U.S. Pat. No. 4,116,917. However, when such polymers were provided with a hydrogenated polybutadiene block of a size sufficient to provide a credit in thickening efficiency, a debit in low temperature performance remained relative to the pure polyisoprene polymers.

Therefore, there remains a need for improved VI improvers that are capable of providing a TE comparable to that of high ethylene content OCP, without the associated reduction in solubility and cold temperature performance.

SUMMARY OF THE INVENTION

In accordance with a first aspect of the invention, there is provided a class of polymers suitable for use as viscosity index improvers for lubricating oil compositions, which polymers comprise hydrogenated linear, radial and star-shaped random copolymers of isoprene and butadiene, wherein at least 70 wt. % of the butadiene is incorporated into the polymer as 1,4 units and the weight ratio of isoprene addition product to butadiene addition product is in the range of from about 90:10 to about 70:30, preferably from about 85:15 to about 80:20.

In accordance with a second aspect of the invention, there is provided a copolymer, as in the first aspect, in the form of a linear or radial, preferably a linear copolymer, preferably having a number average molecular weight of from about 10,000 to 700,000, more preferably from about 50,000 to 200,000.

In accordance with a third aspect of the invention, there is provided a copolymer, as in the first aspect, in the form of a star polymer containing from about 5 to 25 arms, preferably from about 15 to 20 arms, wherein each arm preferably has a number average molecular weight of from about 10,000 to 300,000, more preferably from about 40,000 to 140,000.

In accordance with a fourth aspect of the invention, there is provided a diblock copolymer comprising a first block derived from monoalkenyl arene, preferably styrene, and a second block comprising a linear polymer, as in the second aspect, wherein the number average molecular weight of the diblock copolymer is preferably from about 10,000 to 700,000, more preferably from about 50,000 to 250,000.

In accordance with a fifth aspect of the invention, there is provided a lubricating oil composition comprising a major amount of oil of lubricating viscosity, and a copolymer as in any of the first, second, third and fourth aspect, in an amount effective to modify the viscosity index of the lubricating oil composition.

In accordance with a sixth aspect of the invention, there is provided a method of modifying the viscosity index of a lubricating oil composition comprising a major amount of oil of lubricating viscosity, which method comprises adding to said oil of lubricating viscosity an effective amount of a copolymer as in any of the first, second, third and fourth aspect.

In accordance with a seventh aspect of the invention, there is provided the use of a copolymer of any of the first, second, third and fourth aspect to modify the viscosity index of a lubricating oil composition.

DETAILED DESCRIPTION OF THE INVENTION

Isoprene monomers that may be used as the precursors of the copolymers of the present invention can be incorporated into the polymer as either 1,4- or 3,4-configuration units, and mixtures thereof. Preferably, the majority of the isoprene is incorporated into the polymer as 1,4-units, such as greater than about 60 wt. %, more preferably greater than about 80 wt. %, such as about 80 to 100 wt. %, most preferably greater than about 90 wt. %., such as about 93 wt. % to 100 wt. %.

Butadiene monomers that may be used as the precursors of the copolymers of the present invention can be incorporated into the polymer as either as either 1,2- or 1,4-configuration units. In the polymers of the present invention, at least about 70 wt. %, such as at least about 75 wt. %, preferably at least about 80 wt. %, such as at least about 85 wt. %, more preferably at least about 90, such as 95 to 100 wt. %, of the butadiene is incorporated into the polymer as 1,4 units.

Useful copolymers include those prepared in bulk, suspension, solution or emulsion. As is well known, polymerization of monomers to produce hydrocarbon polymers may be accomplished using free-radical, cationic and anionic initiators or polymerization catalysts, such as transition metal catalysts used for Ziegler-Natta and metallocene type catalysts. Preferably, the random copolymers of the present invention are formed via anionic polymerization as anionic polymerization has been found to provide copolymers having a narrow molecular weight distribution (Mw/Mn), such as a molecular weight distribution of less than about 1.2. Most preferably, the random copolymers of the present invention are formed by polymerizing a mixture of the isoprene and butadiene monomers, in solution, in the presence of an anionic initiator, to form a living polymer.

As is well known, and disclosed, for example, in U.S. Pat. No. 4,116,917, living polymers may be prepared by anionic solution polymerization of a mixture of the conjugated diene monomers in the presence of an alkali metal or an alkali metal hydrocarbon, e.g., sodium naphthalene, as anionic initiator. The preferred initiator is lithium or a monolithium hydrocarbon. Suitable lithium hydrocarbons include unsaturated compounds such as allyl lithium, methallyl lithium; aromatic compounds such as phenyllithium, the tolyllithiums, the xylyllithiums and the naphthyllithiums, and in particular, the alkyl lithiums such as methyllithium, ethyllithium, propyllithium, butyllithium, amyllithium, hexyllithium, 2-ethylhexyllithium and n-hexadecyllithium. Secondary-butyllithium is the preferred initiator. The initiator(s) may be added to the polymerization mixture in two or more stages, optionally together with additional monomer. The living polymers are olefinically unsaturated.

The living random copolymers may be represented by the formula A-M, wherein M is a carbanionic group, i.e., lithium, and A is a random copolymer of polyisoprene and polybutadiene. As noted supra, in the absence of the proper control of the polymerization, the resulting copolymer will not be a random copolymer and will instead comprise a polybutadiene block, a tapered segment containing both butadiene and isoprene addition product, and a polyisoprene block. To prepare a random copolymer, the more reactive butadiene monomer may be added gradually to the polymerization reaction mixture containing the less reactive isoprene such that the molar ratio of the monomers in the polymerization mixture is maintained at the required level. It is also possible to achieve the required randomization by gradually adding a mixture of the monomers to be copolymerized to the polymerization mixture. Living random copolymers may also be prepared by carrying out the polymerization in the presence of a so-called randomizer. Randomizers are polar compounds that do not deactivate the catalyst and randomize the manner in which the monomers are incorporated into to the polymer chain. Suitable randomizers are tertiary amines, such as trimethylamine, triethylamine, dimethylamine, tri-n-propylamine, tri-n-butylamine, dimethylaniline, pyridine, quinoline, N-ethylpiperidine, N-methylmorpholine; thioethers, such as dimethyl sulfide, diethyl sulfide, di-n-propyl sulfide, di-n-butyl sulfide, methyl ethyl sulfide; and in particular, ethers such as dimethyl ether, methyl ether, diethyl ether, di-n-propyl ether, di-n-butyl ether, di-octyl ether, di-benzyl ether, di-phenyl ether, anisole, 1,2-dimethyloxyethane, o-dimethyloxy benzene, and cyclic ethers, such as tetrahydrofuran.

Even with controlled monomer addition and/or the use of a randomizer, the initial and terminal portions of the polymer chains may have greater than a "random" amount of polymer derived from the more reactive and less reactive monomer, respectively. Therefore, for the purpose of this invention, the term "random copolymer" means a polymer chain, or a polymer block, the preponderance of which (greater than 80%, preferably greater than 90%, such as greater than 95%) results from the random addition of comonomer materials.

The solvents in which the living polymers are formed are inert liquid solvents, such as hydrocarbons e.g., aliphatic hydrocarbons such as pentane, hexane, heptane, oxtane, 2-ethylhexane, nonane, decane, cyclohexane, methylcyclohexane, or aromatic hydrocarbons e.g., benzene, toluene, ethylbenzene, the xylenes, diethylbenzenes, propylbenzenes. Cyclohexane is preferred. Mixtures of hydrocarbons e.g., lubricating oils, may also be used.

The temperature at which the polymerization is conducted may be varied within a wide range, such as from about −50° C. to about 150° C., preferably from about 20° C. to about 80° C. The reaction is suitably carried out in an inert atmosphere, such as nitrogen, and may optionally be carried out under pressure e.g., a pressure of from about 0.5 to about 10 bars.

The concentration of the initiator used to prepare the living polymer may also vary within a wide range and is determined by the desired molecular weight of the living polymer.

Where a star polymer is desired, the living polymers formed via the foregoing process may be reacted in an additional reaction step, with a polyalkenyl coupling agent.

Polyalkenyl coupling agents capable of forming star polymers have been known for a number of years and are described, for example, in U.S. Pat. No. 3,985,830. Polyalkenyl coupling agents are conventionally compounds having at least two non-conjugated alkenyl groups. Such groups are usually attached to the same or different electron-withdrawing moiety e.g. an aromatic nucleus. Such compounds have the property that at least of the alkenyl groups are capable of independent reaction with different living polymers and in this respect are different from conventional conjugated diene polymerizable monomers such as butadiene, isoprene, etc. Pure or technical grade polyalkenyl coupling agents may be used. Such compounds may be aliphatic, aromatic or heterocyclic. Examples of aliphatic compounds include the polyvinyl and polyallyl acetylene, diacetylenes, phosphates and phosphates as well as dimethacrylates, e.g. ethylene dimethylacrylate. Examples of suitable heterocyclic compounds include divinyl pyridine and divinyl thiophene.

The preferred coupling agents are the polyalkenyl aromatic compounds and most preferred are the polyvinyl aromatic compounds. Examples of such compounds include those aromatic compounds, e.g. benzene, toluene, xylene, anthracene, naphthalene and durene, which are substituted with at least two alkenyl groups, preferably attached directly thereto. Specific examples include the polyvinyl benzenes e.g. divinyl, trivinyl and tetrvinyl benzenes; divinyl, trivinyl and tetravinyl ortho-, meta- and para-xylenes, divinyl naphthalene, divinyl ethyl benzene, divinyl biphenyl, diisobutenyl benzene, diisopropenyl benzene, and diisopropenyl biphenyl. The preferred aromatic compounds are those represented by the formula A-$(CH=CH_2)_x$, wherein A is an optionally substituted aromatic nucleus and x is an integer of at least 2. Divinyl benzene, in particular meta-divinyl benzene, is the most preferred aromatic compound. Pure or technical grade divinyl benzene (containing other monomers e.g. styrene and ethyl styrene) may be used. The coupling agents may be used in admixture with small amounts of added monomers which increase the size of the nucleus, e.g. styrene or alkyl styrene. In such a case, the nucleus can be described as a poly(dialkenyl coupling agent/monoalkenyl aromatic compound) nucleus, e.g. a poly(divinylbenzene/monoalkenyl aromatic compound) nucleus.

The polyalkenyl coupling agent should be added to the living polymer after the polymerization of the monomers is substantially complete, i.e. the agent should be added only after substantially all the monomer has been converted to the living polymers.

The amount of polyalkenyl coupling agent added may vary within a wide range, but preferably, at least 0.5 mole of the coupling agent is used per mole of unsaturated living polymer. Amounts of from about 1 to about 15 moles, preferably from about 1.5 to about 5 moles per mole of living polymer are preferred. The amount, which can be added in two or more stages, is usually an amount sufficient to convert at least about 80 wt. % to 85 wt. % of the living polymer into star-shaped polymer.

The coupling reaction can be carried out in the same solvent as the living polymerization reaction. The coupling reaction can be carried out at temperatures within a broad range, such as from 0° C. to 150° C., preferably from about 20° C. to about 120° C. The reaction may be conducted in an inert atmosphere, e.g. nitrogen, and under pressure of from about 0.5 bar to about 10 bars.

The star-shaped polymers thus formed are characterized by a dense center or nucleus of crosslinked poly(polyalkenyl coupling agent) and a number of arms of substantially linear unsaturated polymers extending outward from the nucleus. The number of arms may vary considerably, but is typically between about 4 and 25.

The resulting linear or star-shaped copolymers can then be hydrogenated using any suitable means. A hydrogenation catalyst may be used e.g. a copper or molybdenum compound. Catalysts containing noble metals, or noble metal-containing compounds, can also be used. Preferred hydrogenation catalysts contain a non-noble metal or a non-noble metal-containing compound of Group VIII of the periodic Table i.e., iron, cobalt, and particularly, nickel. Specific examples of preferred hydrogenation catalysts include Raney nickel and nickel on kieselguhr. Particularly suitable hydrogenation catalysts are those obtained by causing metal hydrocarbyl compounds to react with organic compounds of any one of the group VIII metals iron, cobalt or nickel, the latter compounds containing at least one organic compound that is attached to the metal atom via an oxygen atom as described, for example, in U.K. Patent No. 1,030,306. Preference is given to hydrogenation catalysts obtained by causing an aluminum trialkyl (e.g. aluminum triethyl (Al$(Et_3)$) or aluminum triisobutyl) to react with a nickel salt of an organic acid (e.g. nickel diisopropyl salicylate, nickel naphthenate, nickel 2-ethyl hexanoate, nickel di-tert-butyl benzoate, nickel salts of saturated monocarboxylic acids obtained by reaction of olefins having from 4 to 20 carbon atoms in the molecule with carbon monoxide and water in the presence of acid catalysts) or with nickel enolates or phenolates (e.g., nickel acetonylacetonate, the nickel salt of butylacetophenone). Suitable hydrogenation catalysts will be well known to those skilled in the art and the foregoing list is by no means intended to be exhaustive.

The hydrogenation of the polymers of the present invention is suitably conducted in solution, in a solvent which is inert during the hydrogenation reaction. Saturated hydrocarbons and mixtures of saturated hydrocarbons are suitable. Advantageously, the hydrogenation solvent is the same as the solvent in which polymerization is conducted. Suitably, at least 50%, preferably at least 70%, more preferably at least 90%, most preferably at least 95% of the original olefinic unsaturation is hydrogenated.

The hydrogenated random copolymer may then be recovered in solid form from the solvent in which it is hydrogenated by any convenient means, such as by evaporating the solvent. Alternatively, oil e.g. lubricating oil, may be added to the solution, and the solvent stripped off from the mixture so formed to provide a concentrate. Suitable concentrates contain from about 3 wt. % to about 25 wt. %, preferably from about 5 wt. % to about 15 wt. % of the hydrogenated random copolymer VI improver.

A hydrogeneated linear random polyisoprene/polybutadiene copolymer of the invention has a weight ratio of polymer derived from isoprene to polymer derived from butadiene of from about 90:10 to about 70:30, preferably from about 85:15 to about 80:20. VI improvers that are hydrogenated random copolymers of the invention will have a number average molecular weight of from about 10,000 to 700,000, preferably from about 30,000 to 400,000, more preferably from about 50,000 to about 250,000. The term "number average molecular weight", as used herein, refers to the number average weight as measured by Gel Permeation Chromatography ("GPC") with a polystyrene standard, subsequent to hydrogenation. It is important to note that, when determining the number average molecular weight of a star polymer using this method, the calculated number average molecular weight will be less than the actual molecular weight due to the three dimensional structure of the star polymer.

The incorporation of additional ethylene units derived from the butadiene increases the TE of the resulting polymeric VI improver. In fact, due to the properties of the anionically polymerized polymer, the TE of hydrogenated linear random polyisoprene/polybutadiene copolymers of the invention, having an ethylene content of from about 15 to about 23 wt. % is comparable to that of an OCP VI improver having an ethylene content of from about 49 wt. % to about 54 wt. %. The TE of VI improver comprising the hydrogenated random copolymer of the invention is improved compared to hydrogenated polyisoprene VI improvers. Therefore, less of the material needs to be used.

A hydrogeneated star shaped random polyisoprene/polybutadiene copolymer of the invention has a weight ratio of polymer derived from isoprene to polymer derived from butadiene of from about 90:10 to about 70:30, preferably from about 85:15 to about 80:20. Such star-shaped copolymers may comprise from about 4 to about 25 arms, preferably from about 15 to 20 arms. Preferably each arm is derived from a living random polyisoprene/polybutadiene copolymer. Each arm may have a number average molecular weight of from about 10,000 to about 300,000, preferably from about 40,000 to about 200,000, more preferably from about 60,000 to about 140,000. VI improvers that are hydrogenated star shaped random polyisoprene/polybutadiene copolymers of the invention may have an overall number average molecular weight from about 100,00 to about 2,000,000, preferably from about 300,000 to about 1,200,000, most preferably from about 450,000 to about 800,000. VI improvers that are hydrogenated random copolymers of the invention will have a number average molecular weight of from about 10,000 to 700,000, preferably from about 30,000 to about 400,000, more preferably from about 50,000 to about 250,000.

Where the random copolymer is to be a block of a block copolymer, the block copolymer may be, and is preferably, prepared by step-wise polymerization of the monomers e.g., polymerizing the random polyisoprene/polybutadiene copolymer, followed by the addition of the other monomer, specifically monoalkenyl arene monomer, to form a living polymer having the formula polyisoprene/polybutadiene-polyalkenyl arene-M. Alternatively, the order can be reversed, and the monoalkenyl arene block can be polymerized first, followed by the addition of the mixture of isoprene/butadiene monomer to form a living polymer having the formula polymonoalkenyl arene-polyisoprene/polybutadiene-M. Suitable monoalkenyl arene monomers include monovinyl aromatic compounds, such as styrene, monovinylnaphthalene, as well as the alkylated derivatives thereof, such as o-, m- and p-methylstyrene, alpha-methyl styrene and tertiary butylstyrene. The preferred monoalkenyl arene is styrene.

In star and linear VI improvers comprising diblocks of styrene and a hydrogenated random polyisoprene/polybutadiene copolymer of the invention, the styrene block of the linear diblock copolymer may comprise from about 5 wt. %, to about 60 wt. %, preferably from about 20 wt. %, to about 50 wt. %, more preferably from about 30 wt. %, to about 40 wt. %, of the diblock copolymer.

The block copolymer may then be hydrogenated and recovered in the same manner described above. Alternatively, the block copolymer may be selectively hydrogenated such that the olefin saturations are hydrogenated as above, while the aromatic unsaturations are hydrogenated to a lesser extent. Preferably, less than 10%, more preferably less than 5% of the aromatic unsaturations are hydrogenated.

Selective hydrogenation techniques are also well known to those of ordinary skill in the art and are described, for example, in U.S. Pat. No. 3,595,942, U.S. Re. Pat. No. 27,145, and U.S. Pat. No. 5,166,277.

Optionally, the VI improvers of the invention can be provided with nitrogen-containing functional groups that impart dispersant capabilities to the VI improver. One trend in the industry has been to use such "multifunctional" VI improvers in lubricants to replace some or all of the dispersant. Nitrogen-containing functional groups can be added to a polymeric VI improver by grafting a nitrogen-containing moiety onto the polymeric backbone of the VI improver. Processes for the grafting of a nitrogen-containing moiety onto a polymer are known in the art and include, for example, contacting the polymer and nitrogen-containing moiety in the presence of a free radical initiator, either neat, or in the presence of a solvent. The free radical initiator may be generated by shearing (as in an extruder) or heating a free radical initiator precursor, such as hydrogen peroxide.

The amount of nitrogen-containing grafting monomer will depend, to some extent, on the nature of the substrate polymer and the level of dispersancy required of the grafted polymer. To impart dispersancy characteristics to both star and linear copolymers, the amount of grafted nitrogen-containing monomer is suitably between about 0.4 and about 2.2 wt. %, preferably from about 0.5 to about 1.8 wt. %, most preferably from about 0.6 to about 1.2 wt. %, based on the total weight of grafted polymer.

Methods for grafting nitrogen-containing monomer onto polymer backbones, and suitable nitrogen-containing grafting monomers are known and described, for example, in U.S. Pat. No. 5,141,996, WO 98/13443, WO 99/21902, U.S. Pat. No. 4,146,489, U.S. Pat. No. 4,292,414, and U.S. Pat. No. 4,506,056. (See also *J. Polymer Science*, Part A: Polymer Chemistry, Vol. 26, 1189–1198 (1988); *J. Polymer Science*, Polymer Letters, Vol. 20, 481–486 (1982) and *J. Polymer Science*, Polymer Letters, Vol. 21, 23–30 (1983), all to Gaylord and Mehta and *Degradation and Cross-linking of Ethylene-Propylene Copolymer Rubber on Reaction with Maleic Anhydride and/or Peroxides; J. Applied Polymer Science*, Vol. 33, 2549–2558 (1987) to Gaylord, Mehta and Mehta.

The compositions of this invention are used principally in the formulation of crankcase lubricating oils for passenger car and heavy duty diesel engines, and comprise a major amount of an oil of lubricating viscosity, a VI improver as described above, in an amount effective to modify the viscosity index of the lubricating oil, and optionally other additives as needed to provide the lubricating oil composition with the required properties. The lubricating oil composition may contain the VI improver of the invention in an amount of from about 0.1 wt. % to about 2.5 wt. %, preferably from about 0.3 wt. % to about 1.5 wt. %, more preferably from about 0.4 wt. % to about 1.3 wt. %, stated as mass percent active ingredient (AI) in the total lubricating oil composition. The viscosity index improver of the invention may comprise the sole VI improver, or may be used in combination with other VI improvers, for example, in combination with an VI improver comprising polyisobutylene, copolymers of ethylene and propylene (OCP), polymethacrylates, methacrylate copolymers, copolymers of an unsaturated dicarboxylic acid and a vinyl compound, interpolymers of styrene and acrylic esters, and hydrogenated copolymers of styrene/isoprene, styrene/butadiene, and other hydrogenated isoprene/butadiene copolymers, as well as the partially hydrogenated homopolymers of butadiene and isoprene.

Oils of lubricating viscosity useful in the context of the present invention may be selected from natural lubricating oils, synthetic lubricating oils and mixtures thereof. The lubricating oil may range in viscosity from light distillate mineral oils to heavy lubricating oils such as gasoline engine oils, mineral lubricating oils and heavy duty diesel oils. Generally, the viscosity of the oil ranges from about 2 centistokes to about 40 centistokes, especially from about 4 centistokes to about 20 centistokes, as measured at 100° C.

Natural oils include animal oils and vegetable oils (e.g., castor oil, lard oil); liquid petroleum oils and hydrorefined, solvent-treated or acid-treated mineral oils of the paraffinic, naphthenic and mixed paraffinic-naphthenic types. Oils of lubricating viscosity derived from coal or shale also serve as useful base oils.

Synthetic lubricating oils include hydrocarbon oils and halo-substituted hydrocarbon oils such as polymerized and interpolymerized olefins (e.g., polybutylenes, polypropylenes, propylene-isobutylene copolymers, chlorinated polybutylenes, poly(1-hexenes), poly(1-octenes), poly(1-decenes)); alkylbenzenes (e.g., dodecylbenzenes, tetradecylbenzenes, dinonylbenzenes, di(2-ethylhexyl)benzenes); polyphenyls (e.g., biphenyls, terphenyls, alkylated polyphenols); and alkylated diphenyl ethers and alkylated diphenyl sulfides and derivative, analogs and homologs thereof.

Alkylene oxide polymers and interpolymers and derivatives thereof where the terminal hydroxyl groups have been modified by esterification, etherification, etc., constitute another class of known synthetic lubricating oils. These are exemplified by polyoxyalkylene polymers prepared by polymerization of ethylene oxide or propylene oxide, and the alkyl and aryl ethers of polyoxyalkylene polymers (e.g., methyl-polyiso-propylene glycol ether having a molecular weight of 1000 or diphenyl ether of poly-ethylene glycol having a molecular weight of 1000 to 1500); and mono- and polycarboxylic esters thereof, for example, the acetic acid esters, mixed $C_3$–$C8$ fatty acid esters and $C_{13}$ oxo acid diester of tetraethylene glycol.

Another suitable class of synthetic lubricating oils comprises the esters of dicarboxylic acids (e.g., phthalic acid, succinic acid, alkyl succinic acids and alkenyl succinic acids, maleic acid, azelaic acid, suberic acid, sebasic acid, fumaric acid, adipic acid, linoleic acid dimer, malonic acid, alkylmalonic acids, alkenyl malonic acids) with a variety of alcohols (e.g., butyl alcohol, hexyl alcohol, dodecyl alcohol, 2-ethylhexyl alcohol, ethylene glycol, diethylene glycol monoether, propylene glycol). Specific examples of such esters includes dibutyl adipate, di(2-ethylhexyl)sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, and the complex ester formed by reacting one mole of sebacic acid with two moles of tetraethylene glycol and two moles of 2-ethylhexanoic acid.

Esters useful as synthetic oils also include those made from $C_5$ to $C_{12}$ monocarboxylic acids and polyols and polyol esters such as neopentyl glycol, trimethylolpropane, pentaerythritol, dipentaerythritol and tripentaerythritol.

Silicon-based oils such as the polyalkyl-, polyaryl-, polyalkoxy- or polyaryloxysilicone oils and silicate oils comprise another useful class of synthetic lubricants; such oils include tetraethyl silicate, tetraisopropyl silicate, tetra-(2-ethylhexyl)silicate, tetra-(4-methyl-2-ethylhexyl)silicate, tetra-(p-tert-butyl-phenyl)silicate, hexa-(4-methyl-2-ethylhexyl)disiloxane, poly(methyl)siloxanes and poly(methylphenyl)siloxanes. Other synthetic lubricating oils include liquid esters of phosphorous-containing acids (e.g., tricresyl phosphate, trioctyl phosphate, diethyl ester of decylphosphonic acid) and polymeric tetrahydrofurans.

Ashless dispersants maintain in suspension oil insolubles resulting from oxidation of the oil during wear or combustion. They are particularly advantageous for preventing the precipitation of sludge and the formation of varnish, particularly in gasoline engines.

When the VI improver of the present invention is replaced by a nitrogen-functionalized equivalent thereof, the amount of ashless dispersant in the formulation can be decreased by at about 25 percent depending upon the amount of dispersant-viscosity index improver (DVII) used in the oil composition.

Metal-containing or ash-forming detergents function both as detergents to reduce or remove deposits and as acid neutralizers or rust inhibitors, thereby reducing wear and corrosion and extending engine life. Detergents generally comprise a polar head with a long hydrophobic tail, with the polar head comprising a metal salt of an acidic organic compound. The salts may contain a substantially stoichiometric amount of the metal in which case they are usually described as normal or neutral salts, and would typically have a total base number or TBN (as can be measured by ASTM D2896) of from 0 to 80. A large amount of a metal base may be incorporated by reacting excess metal compound (e.g., an oxide or hydroxide) with an acidic gas (e.g., carbon dioxide). The resulting overbased detergent comprises neutralized detergent as the outer layer of a metal base (e.g. carbonate) micelle. Such overbased detergents may have a TBN of 150 or greater, and typically will have a TBN of from 250 to 450 or more.

Dihydrocarbyl dithiophosphate metal salts are frequently used as antiwear and antioxidant agents. The metal may be an alkali or alkaline earth metal, or aluminum, lead, tin, molybdenum, manganese, nickel or copper. The zinc salts are most commonly used in lubricating oil and may be prepared in accordance with known techniques by first forming a dihydrocarbyl dithiophosphoric acid (DDPA), usually by reaction of one or more alcohol or a phenol with $P_2S_5$ and then neutralizing the formed DDPA with a zinc compound. For example, a dithiophosphoric acid may be made by reacting mixtures of primary and secondary alcohols. Alternatively, multiple dithiophosphoric acids can be prepared where the hydrocarbyl groups on one are entirely secondary in character and the hydrocarbyl groups on the others are entirely primary in character. To make the zinc salt, any basic or neutral zinc compound could be used but the oxides, hydroxides and carbonates are most generally employed. Commercial additives frequently contain an excess of zinc due to the use of an excess of the basic zinc compound in the neutralization reaction.

Oxidation inhibitors or antioxidants reduce the tendency of mineral oils to deteriorate in service. Oxidative deterioration can be evidenced by sludge in the lubricant, varnish-like deposits on the metal surfaces, and by viscosity growth. Such oxidation inhibitors include hindered phenols, alkaline earth metal salts of alkylphenolthioesters having preferably $C_5$ to $C_{12}$ alkyl side chains, calcium nonylphenol sulfide, oil soluble phenates and sulfurized phenates, phosphosulfurized or sulfurized hydrocarbons, phosphorous esters, metal thiocarbamates, oil soluble copper compounds as described in U.S. Pat. No. 4,867,890, and molybdenum-containing compounds and aromatic amines.

Known friction modifiers include oil-soluble organo-molybdenum compounds. Such organo-molybdenum friction modifiers also provide antioxidant and antiwear credits to a lubricating oil composition. As an example of such oil soluble organo-molybdenum compounds, there may be mentioned the dithiocarbamates, dithiophosphates, dithiophosphinates, xanthates, thioxanthates, sulfides, and the like, and mixtures thereof. Particularly preferred are molybdenum dithiocarbamates, dialkyldithiophosphates, alkyl xanthates and alkylthioxanthates.

Other known friction modifying materials include glyceryl monoesters of higher fatty acids, for example, glyceryl mono-oleate; esters of long chain polycarboxylic acids with diols, for example, the butane diol ester of a dimerized unsaturated fatty acid; oxazoline compounds; and alkoxylated alkyl-substituted mono-amines, diamines and alkyl ether amines, for example, ethoxylated tallow amine and ethoxylated tallow ether amine.

Pour point depressants, otherwise known as lube oil flow improvers (LOFI), lower the minimum temperature at which the fluid will flow or can be poured. Such additives are well known. Typical of those additives that improve the low temperature fluidity of the fluid are $C_8$ to $C_{18}$ dialkyl fumarate/vinyl acetate copolymers, and polymethacrylates.

Foam control can be provided by an antifoamant of the polysiloxane type, for example, silicone oil or polydimethyl siloxane.

Some of the above-mentioned additives can provide a multiplicity of effects; thus for example, a single additive may act as a dispersant-oxidation inhibitor. This approach is well known and need not be further elaborated herein.

It may also be necessary to include an additive which maintains the stability of the viscosity of the blend. Thus, although polar group-containing additives achieve a suitably low viscosity in the pre-blending stage it has been observed that some compositions increase in viscosity when stored for prolonged periods. Additives which are effective in controlling this viscosity increase include the long chain hydrocarbons functionalized by reaction with mono- or dicarboxylic acids or anhydrides which are used in the preparation of the ashless dispersants as hereinbefore disclosed.

Representative effective amounts of such additional additives, when used in crankcase lubricants, are listed below:

| ADDITIVE | Mass % (Broad) | Mass % (Preferred) |
| --- | --- | --- |
| Ashless Dispersant | 0.1–20 | 1–8 |
| Metal Detergents | 0.1–15 | 0.2–9 |
| Corrosion Inhibitor | 0–5 | 0–1.5 |
| Metal Dihydrocarbyl Dithiophosphate | 0.1–6 | 0.1–4 |
| Antioxidant | 0–5 | 0.01–2 |
| Pour Point Depressant | 0.01–5 | 0.01–1.5 |
| Antifoaming Agent | 0–5 | 0.001–0.15 |
| Supplemental Antiwear Agents | 0–1.0 | 0–0.5 |
| Friction Modifier | 0–5 | 0–1.5 |
| Basestock | Balance | Balance |

It may be desirable, although not essential, to prepare one or more additive concentrates comprising additives (concentrates sometimes being referred to as additive packages) whereby several additives can be added simultaneously to the oil to form the lubricating oil composition. The final lubricant composition may employ from 5 to 25 mass %, preferably 5 to 18 mass %, typically 10 to 15 mass % of the concentrate, the remainder being oil of lubricating viscosity.

This invention will be further understood by reference to the following examples. In the following Examples, the properties of certain VI improvers are described using certain terms of art, which are defined below. In the Examples, all parts are parts by weight, unless otherwise noted.

"Shear Stability Index (SSI)" measures the ability of polymers used as V.I. improvers in crankcase lubricants to maintain thickening power during SSI is indicative of the resistance of a polymer to degradation under service conditions. The higher the SSI, the less stable the polymer, i.e., the more susceptible it is to degradation. SSI is defined as the percentage of polymer-derived viscosity loss and is calculated as follows:

$$SSI = 100 \times \frac{kv_{fresh} - kv_{after}}{kv_{fresh} - kv_{oil}}$$

wherein $kv_{fresh}$ is the kinematic viscosity of the polymer-containing solution before degradation and $kv_{after}$ is the kinematic viscosity of the polymer-containing solution after degradation. SSI is conventionally determined using ASTM D6278-98 (known as the Kurt-Orban (KO) or DIN bench test). The polymer under test is dissolved in suitable base oil (for example, solvent extracted 150 neutral) to a relative viscosity of 2 to 3 centistokes at 100° C. and the resulting fluid is pumped through the testing apparatus specified in the ASTM D6278-98 protocol.

"Thickening Efficiency (TE)" is representative of a polymers ability to thicken oil per unit mass and is defined as:

$$TE = \frac{2}{c\ln 2} \ln\left(\frac{kv_{oil+polymer}}{kv_{oil}}\right)$$

wherein c is polymer concentration (grams of polymer/100 grams solution), $kv_{oil+polymer}$ is kinematic viscosity of the polymer in the reference oil, and $kv_{oil}$ is kinematic viscosity of the reference oil.

"Cold Cranking Simulator (CCS)" is a measure of the cold-cranking characteristics of crankcase lubricants and is conventionally determined using a technique described in ASTM D5293-92.

"Scanning Brookfield" is used to measure the apparent viscosity of engine oils at low temperatures. A shear rate of approximately $0.2\ s^{-1}$ is produced at shear stresses below 100 Pa. Apparent viscosity is measured continuously as the sample is cooled at a rate of 1° C./h over the range of −5° C. to −40° C., or to the temperature at which the viscosity exceeds 40,000 mPa·s (cP). The test procedure is defined in ASTM D5133-01. The measurements resulting from the test method are reported as viscosity in mPa·s or the equivalent cP, the maximum rate of viscosity increase (Gelation Index) and the temperature at which the Gelation Index occurs.

"Mini Rotary Viscometer (MRV)-TP-1" measures yield stress and viscosity of engine oils after cooling at controlled rates over a period of 45 hours to a final test temperature between −15° C. and −40° C. The temperature cycle is defined in SAE Paper No. 850443, K. O. Henderson et al. Yield stress (YS) is measured first at the test temperature and apparent viscosity is then measured at a shear stress of 525 Pa over a shear rate of 0.4 to $15^{s-1}$. for Apparent viscosity is reported in mPa·s, or the equivalent cP.

"Pour point" measures the ability of an oil composition to flow as the temperature is lowered. Performance is reported in degrees centigrade and is measured using the test procedure described in ASTM D97-02. After preliminary heating, the sample is cooled at a specified rate and examined at intervals of 3° C. for flow characteristics. The lowest temperature at which movement of the specimen is observed is reported as the pour point. Each of MRV-TP-1, CCS and pour point is indicative of the low temperature viscometric properties of oil compositions.

"Crystallinity" in ethylene-alpha-olefin polymers can be measured using X-ray techniques known in the art as well as by the use of a differential scanning calorimetry (DSC) test. DSC can be used to measure crystallinity as follows: a polymer sample is annealed at room temperature (e.g., 20–25° C.) for at least 24 hours before the measurement. Thereafter, the sample is first cooled to −100° C. from room temperature, and then heated to 150 C at 10° C./min. Crystallinity is calculated as follows:

$$\% \text{ Crystallinity} = \left(\sum \Delta H\right) \times x_{methylene} \times \frac{14}{4110} \times 100\%,$$

wherein $\Sigma \Delta H$ (J/g) is the sum of the heat absorbed by the polymer above its glass transition temperature, $x_{methylene}$ is the molar fraction of ethylene in the polymer calculated, e.g., from proton NMR data, 14 (g/mol) is the molar mass of a methylene unit, and 4110 (J/mol) is the heat of fusion for a single crystal of polyethylene at equilibrium.

EXAMPLE 1

Three radial polymers were prepared having compositions as presented in Table 1:

TABLE 1

| Polymer | Butadiene | PS Block | EP/EB* Block |
|---|---|---|---|
| Comp. 1 | 0 | 0 | 71012 |
| Comp. 2 | 0 | 3466 | 75819 |
| Inv. 1 | 22.0 | 0 | 72700 |

*EP indicates ethylene/propylene units derived from polymerization of hydrogenated isoprene;
EB indicates ethylene/butene units derived from polymerization of hydrogenated butadiene. The above molecular weights were determined as polystyrene equivalent weights.

For each polymer referenced in this example, three oils were blended in the same base blend with varying VM treat rates. The resulting $kv_{100}$ values were recorded, and the amount of solid polymer (treat) needed to achieve a target $kv_{100}$ was calculated. Each blended oil sample was subjected to degradation in a standard 30-cycle KO test. Results are shown in Table 2.

TABLE 2

| Polymer | $kv_{100}$ Fresh Oil (cSt) | $kv_{100}$ After (cSt) | Polymer Treat for $kv_{100}$ of 15 cSt (mass % AI) |
|---|---|---|---|
| Comp. 1 | 15.00 | 14.52 | 0.68 |
| Comp. 2 | 15.00 | 13.72 | 0.63 |
| Inv. 1 | 15.00 | 14.58 | 0.61 |

The data of Table 2 demonstrates that the VII of the invention (Inv. 1) is more shear stable than the comparative materials (Comp. 1 and Comp. 2). Further, less of Inv. 1 is needed to achieve target $kv_{100}$ of 15.0 cSt, which establishes the improved thickening efficiency of the inventive VI improvers.

Using VI improvers Comp. 1 and Inv. 1, lubricating oil formulations approximating commercial PCMO (passenger car motor oil) and HDD (heavy duty diesel) formulations are prepared using a matrix of base oils (Group I, Group II and Group III), grades (15W40, 5W30 and 10W40, treat rates and pour point depressants (PPDs). The resulting formulations are measured to determine fresh oil, low temperature viscometrics (CCS, Scanning Brookfield, MRV-TP1, Pour Point). The fresh oil, low temperature viscometrics of formulations prepared using Inv. 1 are found to be comparable to those of prepared with Comp. 1.

EXAMPLE 2

Compared to high-ethylene content (greater than 55 wt. % derived from ethylene) olefin copolymer (OCP) VI improvers, the VI improvers of the invention can be shown to allow for more flexibility in PPD and base oil selection and provide lower treat rates. Low temperature pumpability (MRV-TP1) data for fresh oils blended with a VI improver of the invention (Inv. 1) or a high-ethylene OCP (Comp. 3 having an ethylene content of 64 wt. % and a $M_n$ of 97,000), in 15W40 HDD formulations, are provided in Table 3. The oils are initially blended with no PPD added, and then supplemented with various PPDs at different treat rates. A total of seven PPDs are tested with five treat rates for each type.

TABLE 3

| VM | treat % | Inv. 1 Y.S. | Inv. 1 Vis. (cP) | Comp. 3 Y.S. | Comp. 3 Vis. (cP) |
|---|---|---|---|---|---|
| PPD 1 | 0.1 | <35 | 26194 | | |
| | 0.3 | <35 | 24632 | | |
| | 0.5 | <35 | 26015 | <35 | 21955 |
| | 0.8 | <35 | 27075 | <35 | 20921 |
| | 1 | <35 | 26935 | <35 | 21283 |
| PPD 2 | 0.1 | <35 | 27240 | <35 | 21395 |
| | 0.3 | <35 | 29207 | <35 | 23860 |
| | 0.5 | <35 | 29251 | <35 | 22444 |
| | 0.8 | <35s | 34069 | <35 | 23059 |
| | 1 | <35s | 32415 | <35 | 23930 |
| PPD 3 | 0.1 | <35 | 29629 | <35 | 20689 |
| | 0.3 | <35 | 29921 | <35 | 23499 |
| | 0.5 | <35 | 30154 | <35 | 21966 |
| | 0.8 | <35 | 29872 | <35 | 21750 |
| | 1 | <35s | 30132 | <35 | 21093 |
| PPD 4 | 0.1 | <35s | 53768 | <35 | 24426 |
| | 0.3 | <35 | 32236 | <35 | 24440 |
| | 0.5 | <35 | 32060 | <35 | 28805 |
| | 0.8 | <35 | 38423 | | |
| | 1 | <35s | 42009 | | |
| PPD 5 | 0.1 | <35 | 26492 | <35 | 22007 |
| | 0.3 | <35 | 28116 | <35 | 23127 |
| | 0.5 | <35 | 27121 | <35 | 22042 |
| | 0.8 | <35 | 26869 | <35 | 21616 |
| | 1 | <35 | 28800 | <35 | 21935 |
| PPD 6 | 0.1 | <35 | 26950 | <35 | 22111 |
| | 0.3 | <35 | 28884 | <35 | 23837 |
| | 0.5 | <35 | 28630 | <35 | 21966 |
| | 0.8 | <35 | 29429 | <35 | 22693 |
| | 1 | <35 | 28522 | <35 | 22640 |
| PPD 7 | 0.1 | <35 | 24529 | | |
| | 0.3 | <35 | 24646 | <35 | 30043 |
| | 0.5 | <35 | 24468 | <35 | 20935 |
| | 0.8 | <35 | 26558 | <35 | 21343 |
| | 1 | <35 | 26745 | <35 | 21539 |

Note:
Shaded cells indicate viscometric failures. PPDs used represent conventional technologies including both FVA and PMA-based polymers The VI improver of the invention is shown to be less sensitive to the selection of base oil and PPD than the high-ethylene OCP VII.

EXAMPLE 3

There are two industry accepted engine tests for determination of used oil low temperature viscometric performance. In the evaluation of PCMO formulations, used oil low temperature viscometric performance is determined using an API-certified double-length Sequence IIIF test. For the evaluation of HDD formulations, the Mack T10A test is relied upon. Used oils are generated in engine tests and subsequently tested for low temperature viscometrics performance. For the double-length IIIF test, passage requires that used oil, low temperature viscometrics, particularly CCS and MRV-TP1, cannot deteriorate over one W grade. To pass the Mack T-10A test, MRV-TP1 viscosity of the used oil cannot exceed 25,000 cP with no yield stress failure when tested at −20° C. regardless of the W grade of the fresh oil.

Two 5W30 PCMO formulations containing 100% Group-II base oils are prepared. The two formulations are identical, except for the VI improver. One formulation is blended with high-ethylene OCP (Comp. 4, ethylene content of 58 wt. % and $M_n$ of 135,000), and the other with a VI improver of the invention (Inv. 1). The two formulations are subjected to a double-length Sequence IIIF test, the viscometrics for used oils results are measured, and the used oil $kv_{40}$ and MRV-TP-1 results are provided in Table 4.

TABLE 4

| | Inv. 1 | | Comp. 4 | |
|---|---|---|---|---|
| VM Test Hours | $kv_{40}$ increase (%) | MRV-TP1 Vis. (cP) | $kv_{40}$ increase (%) | MRV-TP1 Vis. (cP) |
| 0 | — | 10900 | — | 6410 |
| 10 | −3.9 | 12000 | 2.0 | 7850 |
| 20 | −6.3 | 12900 | 8.6 | 10200 |
| 30 | −6.2 | 14700 | 16.6 | 12200 |
| 40 | −4.5 | 15200 | 21.9 | 13600 |
| 50 | −1.7 | 15000 | 26.6 | 16100 |
| 60 | 0.9 | 15600 | 29.5 | 17000 |
| 70 | 5.1 | 16300 | 35.5 | 18200 |
| 80 | 8.5 | 17600 | 40.4 | 22300 |
| 90 | 11.6 | 19000 | 45.3 | 23300 |
| 100 | 14.8 | 19600 | 51.0 | 25900 |
| 110 | 20.0 | 20800 | 58.0 | 30200 |
| 120 | 31.4 | 24200 | 64.4 | 35200 |
| 130 | 54.5 | 32000 | 72.7 | 49200 |
| 140 | 92.8 | 45500 | 83.9 | 65300 |
| 150 | 153.6 | 70900 | 92.7 | 86500 |
| 160 | 243.9 | 112500 | 105.9 | 10200 |

As shown by the data of Table 4, with the lubricating oil containing Inv. 1 as the VII, MRV-TP1 viscosity increases linearly with $kv_{40}$ and MRV -TP1 exceeds the maximum limit (60,000 cP) at a point at which $kv_{40}$ had risen to about 120%. For the oil blended with the high-ethylene VII (Comp. 4), MRV-TP1 viscosity deteriorates much faster than $kv_{40}$, and increases above 60,000 cP at a point corresponding to a $kv_{40}$ increase of only about 85%. Therefore, it can be shown that the used oil low temperature viscometrics for the VI improvers of the invention are superior to those of high-ethylene content OCPs.

EXAMPLE 4

For HDD formulations, passage of the Mack T-10A test is the only used oil low temperature viscometric requirement. It has been established that adding the PPD after the test is equivalent to testing the oil with PPD. All test oils were blended in 15W40 HDD formulation with the same DI (dispersant-inhibitor) package and base oil. Shown in Table 5 are PPD response profiles for both fresh and after-test oils that are blended with the butadiene-free Comp. 2 and the inventive material Inv. 1. Low temperature pumpability of oils containing Inv. 1 is shown to be equivalent to the oils containing Comp. 2.

TABLE 5

| | | Comp.2 | | | | Inv. 1 | | | |
|---|---|---|---|---|---|---|---|---|---|
| | | Fresh Oil | | Used Oil | | Fresh Oil | | Used Oil | |
| VM | treat | Y.S. | Vis. (cP) | Y.S. | Vis. (cP) | Y.S. | Vis. (cP) | Y.S. | Vis. (cP) |
| PPD 1 | 0.1 | <35 | 26194 | <35 | 16436 | <35 | 26354 | <35 | 13549 |
| | 0.3 | <35 | 24632 | <35 | 16894 | <35 | 25971 | <35 | 14561 |
| | 0.5 | <35 | 26015 | <35 | 16130 | <35 | 26917 | <35 | 14578 |
| | 0.8 | <35 | 27075 | <35 | 16004 | <35 | 26983 | <35 | 14569 |
| | 1 | <35 | 26935 | <35 | 15927 | <35 | 27454 | <35 | 14726 |
| PPD 2 | 0.1 | <35 | 27240 | <35 | 15136 | <35 | 28334 | <35 | 13678 |
| | 0.3 | <35 | 29207 | <35 | 16362 | <35 | 28239 | <35 | 14774 |
| | 0.5 | <35 | 29251 | <35 | 16201 | <35 | 27834 | <35 | 15582 |
| | 0.8 | <35s | 34069 | <35 | 15767 | <35 | 29185 | <35 | 16071 |
| | 1 | <35s | 32415 | <35 | 17040 | <35 | 30161 | <35 | 16694 |
| PPD 3 | 0.1 | <35 | 29629 | <35 | 14000 | <35 | 27945 | <35 | 14081 |
| | 0.3 | <35 | 29921 | <35 | 15867 | <35 | 27172 | <35 | 15058 |
| | 0.5 | <35 | 30154 | <35 | 16108 | <35 | 27312 | <35 | 15058 |
| | 0.8 | <35 | 29872 | <35 | 15813 | <35 | 27725 | <35 | 15298 |
| | 1 | <35s | 30132 | <35 | 15509 | <35 | 27679 | <35 | 15201 |
| PPD 4 | 0.1 | <35s | 53768 | <35 | 15538 | <35 | 52715 | <35 | 14961 |
| | 0.3 | <35 | 32236 | <35 | 16614 | <35 | 31497 | <35 | 15868 |

TABLE 5-continued

|  |  | Comp.2 | | | | Inv. 1 | | | |
|  |  | Fresh Oil | | Used Oil | | Fresh Oil | | Used Oil | |
| VM | treat | Y.S. | Vis. (cP) | Y.S. | Vis. (cP) | Y.S. | Vis. (cP) | Y.S. | Vis. (cP) |
|---|---|---|---|---|---|---|---|---|---|
|  | 0.5 | <35 | 32060 | <35s | 18013 | <35 | 32110 | *shaded* | *shaded* |
| 0.8 |  | <35 | 38423 | *shaded* | *shaded* | <35 | 38124 | *shaded* | *shaded* |
| 1 |  | <35s | 42009 | *shaded* | *shaded* | <35 | 41886 | *shaded* | *shaded* |
| PPD 5 | 0.1 | <35 | 26492 | <35 | 14820 | <35 | 27272 | <35 | 13566 |
|  | 0.3 | <35 | 28116 | <35 | 15256 | <35 | 26557 | <35 | 14616 |
|  | 0.5 | <35 | 27121 | <35 | 15266 | <35 | 25646 | <35 | 14742 |
|  | 0.8 | <35 | 26869 | <35 | 15641 | <35 | 27554 | <35 | 15329 |
|  | 1 | <35 | 28800 | <35 | 15793 | <35 | 27241 | <35 | 15166 |
| PPD 6 | 0.1 | <35 | 26950 | <35 | 17846 | <35 | 27874 | <35 | 14188 |
|  | 0.3 | <35 | 28884 | <35 | 17872 | <35 | 26589 | <35 | 14925 |
|  | 0.5 | <35 | 28630 | <35 | 18512 | <35 | 25960 | <35 | 15013 |
|  | 0.8 | <35 | 29429 | <35 | 19186 | <35 | 28625 | <35 | 16451 |
|  | 1 | <35 | 28522 | <35 | 20241 | <35 | 29795 | <35 | 17132 |
| PPD 7 | 0.1 | <35 | 24529 | <35 | 14592 | <35 | 27761 | <35 | 13410 |
|  | 0.3 | <35 | 24646 | <35 | 14841 | <35 | 25341 | <35 | 14406 |
|  | 0.5 | <35 | 24468 | <35 | 15387 | <35 | 25004 | <35 | 14723 |
|  | 0.8 | <35 | 26558 | <35 | 15757 | <35 | 25181 | <35 | 14702 |
|  | 1 | <35 | 26745 | <35 | 16175 | <35 | 24379 | <35 | 14381 |

Note:
Shaded cells indicate viscometric failures.

Shown in the following Table 6 are PPD response profiles for both fresh and after test oils that are blended with Inv. 1 and a shear stable high-ethylene OCP polymer (Comp. 3). PPD appetite based on used oil low temperature pumpability does not change for oil containing Inv. 1. On the other hand, oil blended with Comp. 4 has catastrophic pumpability failures due to presence of yield stress, and proper PPD solutions to the problem are limited.

TABLE 6

|  |  | Inv. 1 | | | | Comp. 4 | | | |
|  |  | Fresh Oil | | Used Oil | | Fresh Oil | | Used Oil | |
| VM | treat | Y.S. | Vis. (cP) | Y.S. | Vis. (cP) | Y.S. | Vis. (cP) | Y.S. | Vis. (cP) |
|---|---|---|---|---|---|---|---|---|---|
| PPD 1 | 0.1 | <35 | 26194 | <35 | 16436 | <35 | 20599 | *shaded* | *shaded* |
|  | 0.3 | <35 | 24632 | <35 | 16894 | <35 | 20031 | *shaded* | *shaded* |
|  | 0.5 | <35 | 26015 | <35 | 16130 | <35 | 20118 | *shaded* | *shaded* |
|  | 0.8 | <35 | 27075 | <35 | 16004 | <35 | 19354 | *shaded* | *shaded* |
|  | 1 | <35 | 26935 | <35 | 15927 | <35 | 19381 | *shaded* | *shaded* |
| PPD 2 | 0.1 | <35 | 27240 | <35 | 15136 | <35 | 20399 | *shaded* | *shaded* |
|  | 0.3 | <35 | 29207 | <35 | 16362 | <35 | 22488 | <35 | 14574 |
|  | 0.5 | <35 | 29251 | <35 | 16201 | <35 | 23268 | <35 | 16824 |
|  | 0.8 | <35 | 34069 | <35 | 15767 | <35 | 23235 | *shaded* | *shaded* |
|  | 1 | <35 | 32415 | <35 | 17040 | <35 | 22592 | *shaded* | *shaded* |
| PPD 3 | 0.1 | <35 | 29629 | <35 | 14000 | <35 | 21164 | *shaded* | *shaded* |
|  | 0.3 | <35 | 29921 | <35 | 15867 | <35 | 21341 | *shaded* | *shaded* |
|  | 0.5 | <35 | 30154 | <35 | 16108 | <35 | 22170 | *shaded* | *shaded* |
|  | 0.8 | <35 | 29872 | <35 | 15813 | <35 | 21990 | <35 | 18316 |
|  | 1 | <35 | 30132 | <35 | 15509 | <35 | 20401 | *shaded* | *shaded* |
| PPD 4 | 0.1 | <35 | 53768 | <35 | 15538 | <35 | 38313 | *shaded* | *shaded* |
|  | 0.3 | <35 | 32236 | <35 | 16614 | <35 | 23529 | *shaded* | *shaded* |
|  | 0.5 | <35 | 32060 | <35 | 18013 | <35 | 25318 | *shaded* | *shaded* |

TABLE 6-continued

|  |  | Inv. 1 | | | | Comp. 4 | | | |
|  |  | Fresh Oil | | Used Oil | | Fresh Oil | | Used Oil | |
| VM | treat | Y.S. | Vis. (cP) | Y.S. | Vis. (cP) | Y.S. | Vis. (cP) | Y.S. | Vis. (cP) |
|  | 0.8 | <35 | 38423 | *70* | *19644* | <35 | 30119 | *105* | *19718* |
|  | 1 | <35 | 42009 | *70* | *23461* | <35 | 33421 | *105* | *20896* |
| PPD 5 | 0.1 | <35 | 26492 | <35 | 14820 | <35 | 21290 | *70* | *15087* |
|  | 0.3 | <35 | 28116 | <35 | 15256 | <35 | 22036 | *70* | *15736* |
|  | 0.5 | <35 | 27121 | <35 | 15266 | <35 | 21890 | *70* | *14845* |
|  | 0.8 | <35 | 26869 | <35 | 15641 | <35 | 20998 | *70* | *15580* |
|  | 1 | <35 | 28800 | <35 | 15793 | <35 | 20549 | *70* | *15934* |
| PPD 6 | 0.1 | <35 | 26950 | <35 | 17846 | <35 | 18283 | *70* | *15361* |
|  | 0.3 | <35 | 28884 | <35 | 17872 | <35 | 21460 | *70* | *16950* |
|  | 0.5 | <35 | 28630 | <35 | 18512 | <35 | 21854 | *70* | *17186* |
|  | 0.8 | <35 | 29429 | <35 | 19186 | <35 | 22993 | *105* | *20182* |
|  | 1 | <35 | 28522 | <35 | 20241 | <35 | 23940 | *105* | *19708* |
| PPD 7 | 0.1 | <35 | 24529 | <35 | 14592 | <35 | 21224 | *105* | *19209* |
|  | 0.3 | <35 | 24646 | <35 | 14841 | <35 | 20462 | *105* | *22937* |
|  | 0.5 | <35 | 24468 | <35 | 15357 | <35 | 19814 | *70* | *15303* |
|  | 0.8 | <35 | 26558 | <35 | 15757 | <35 | 18393 | *70* | *15807* |
|  | 1 | <35 | 26745 | <35 | 16175 | <35 | 19755 | *70* | *15684* |

Note:
Shaded cells indicate viscometric failures.

The data provided demonstrates that the VI improvers of the invention provide the thickening efficiency of the high ethylene content OCP VI improvers without the CCS debits, and the cold temperature properties of isoprene and isoprene/styrene block polymer VI improvers with improved thickening efficiency.

The disclosures of all patents, articles and other materials described herein are hereby incorporated, in their entirety, into this specification by reference. The principles, preferred embodiments and modes of operation of the present invention have been described in the foregoing specification. What applicants submit is their invention, however, is not to be construed as limited to the particular embodiments disclosed, since the disclosed embodiments are regarded as illustrative rather than limiting. Changes may be made by those skilled in the art without departing from the spirit of the invention. Further, when used to describe combinations of components (e.g., VI improver, PPD and oil), the term "comprising" should be construed to include the composition resulting from admixing of the noted components.

What is claimed is:

1. A polymer suitable for use as a viscosity index improver for lubricating oil compositions, which polymer comprises at least one, at least partially hydrogenated star-shaped random copolymer of isoprene and butadiene, wherein at least 70 wt. % of the butadiene is incorporated into the polymer as 1,4 units and the weight ratio of isoprene addition product to butadiene addition product in said copolymer is in a range of from about 90:10 to about 70:30.

2. The polymer of claim 1, wherein said weight ratio is from about 85:15 to about 75:25.

3. The polymer of claim 1, wherein said star polymer has from about 4 to about 25 arms, and each arm has a molecular weight of from about 10,000 to about 300,000.

4. The polymer of claim 3, wherein said star polymer has from about 15 to about 20 arms, and each arm has a molecular weight of from about 60,000 to about 140,000.

5. The polymer of claim 4 having a number average molecular weight of from about 450,000 to about 800,000.

6. The polymer of claim 1, wherein at least about 90 wt. % of the butadiene is incorporated into the polymer as 1,4 units.

7. The polymer of claim 1, wherein at least about 90 wt. % of the isoprene is incorporated into the polymer as 1,4 units.

8. The polymer of claim 1, comprising an anionic living polymerization product.

9. The polymer of claim 1, wherein said polymer has a molecular weight distribution of less than about 1.2.

10. A star polymer, the arms of which are a diblock copolymer having at least one first polymer block derived from monoalkenyl arene, and at least one second polymer block comprising at least partially hydrogenated random copolymer of isoprene and butadiene, wherein at least 70 wt. % of the butadiene is incorporated into the polymer as 1.4 units and the weight ratio of isoprene addition product to butadiene addition product in said copolymer is in a range of from about 90:10 to about 70:30.

11. The polymer of claim 10, wherein said arms have a number average molecular weight of from about 10,000 to about 700,000, and wherein said at least one first block comprises from about 5 wt. % to about 60 wt. % of said diblock copolymer.

12. The polymer of claim 11, wherein said number average molecular weight of said arms is from about 10,000 to about 300,000.

13. A lubricating oil composition comprising a major amount of oil of lubricating viscosity, and a polymer of claim 1, in an amount effective to modify the viscosity index of the lubricating oil composition.

14. A method of modifying the viscosity index of a lubricating oil composition comprising a major amount of oil of lubricating viscosity, which method comprises adding to said oil of lubricating viscosity an effective amount of a polymer of claim 1.

* * * * *